(12) United States Patent
Zhang et al.

(10) Patent No.: US 10,187,900 B2
(45) Date of Patent: Jan. 22, 2019

(54) INTERFERENCE MANAGEMENT WITH COLORING CONCEPT

(71) Applicant: QUALCOMM Incorporated, San Diego, CA (US)

(72) Inventors: Xiaoxia Zhang, San Diego, CA (US); Taesang Yoo, Riverside, CA (US); Siddhartha Mallik, San Diego, CA (US); Juan Montojo, San Diego, CA (US); Aleksandar Damnjanovic, Del Mar, CA (US)

(73) Assignee: QUALCOMM Incorporated, San Diego, CA (US)

( * ) Notice: Subject to any disclaimer, the term of this patent is extended or adjusted under 35 U.S.C. 154(b) by 94 days.

(21) Appl. No.: 15/608,512

(22) Filed: May 30, 2017

(65) Prior Publication Data

US 2018/0132261 A1    May 10, 2018

Related U.S. Application Data

(60) Provisional application No. 62/417,815, filed on Nov. 4, 2016.

(51) Int. Cl.
*H04W 74/08* (2009.01)
*H04W 72/12* (2009.01)
*H04J 11/00* (2006.01)

(52) U.S. Cl.
CPC ... *H04W 72/1231* (2013.01); *H04W 72/1263* (2013.01); *H04W 74/0816* (2013.01); *H04J 2011/0016* (2013.01)

(58) Field of Classification Search
CPC ......... H04W 72/1231; H04W 74/0816; H04W 72/1263; H04J 2011/0016
See application file for complete search history.

(56) References Cited

U.S. PATENT DOCUMENTS

| 8,406,171 B2 | 3/2013 | Onggosanusi et al. |
| 2013/0235773 A1* | 9/2013 | Wang ............... H04W 52/0206 370/311 |

(Continued)

FOREIGN PATENT DOCUMENTS

| WO | WO-2011082526 A1 | 7/2011 |
| WO | WO-2016048798 A1 | 3/2016 |
| WO | WO-2016164145 A1 | 10/2016 |

OTHER PUBLICATIONS

International Search Report and Written Opinion—PCT/US2017/055626—ISA/EPO—dated Jan. 30, 2018.

*Primary Examiner* — Phuc H Tran
(74) *Attorney, Agent, or Firm* — Liem T. Do

(57) ABSTRACT

Interference management with a coloring concept is discussed. A target transmitter may obtain a first priority schedule for a transmission opportunity of the target transmitter, wherein the first priority schedule identifies transmission priority for a plurality of base station groups. Each of the base station groups may include one or more base stations that are grouped according to various transmission criteria. The target transmitter will identify data for transmission and monitor the medium sensing slots corresponding to each of the base station groups for a medium reservation signal. The highest priority medium reservation signal may be determined out of any medium reservation signals detected during the monitoring, The highest priority medium reservation signal is determined according to the first priority schedule. Once identified, the data is transmitted by the target transmitter when the highest priority medium reservation signal corresponds to the target transmitter.

30 Claims, 9 Drawing Sheets

(56) References Cited

U.S. PATENT DOCUMENTS

2015/0023342 A1\* 1/2015 Joo .................. H04W 56/0035
370/350
2015/0305037 A1 10/2015 Zhang et al.
2016/0028448 A1 1/2016 Park et al.

\* cited by examiner

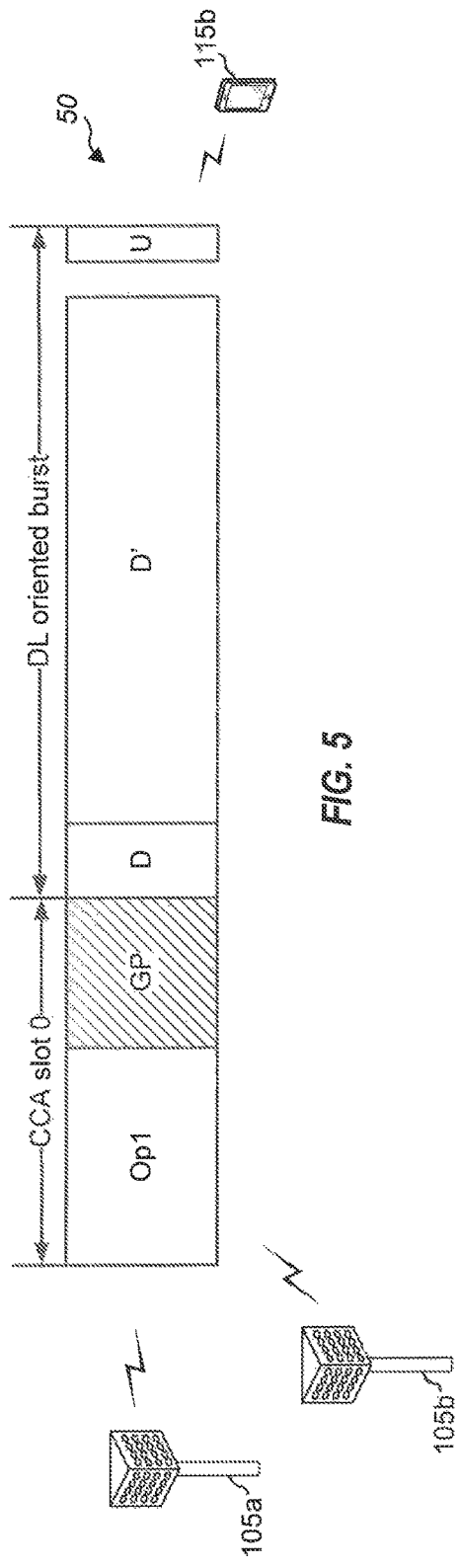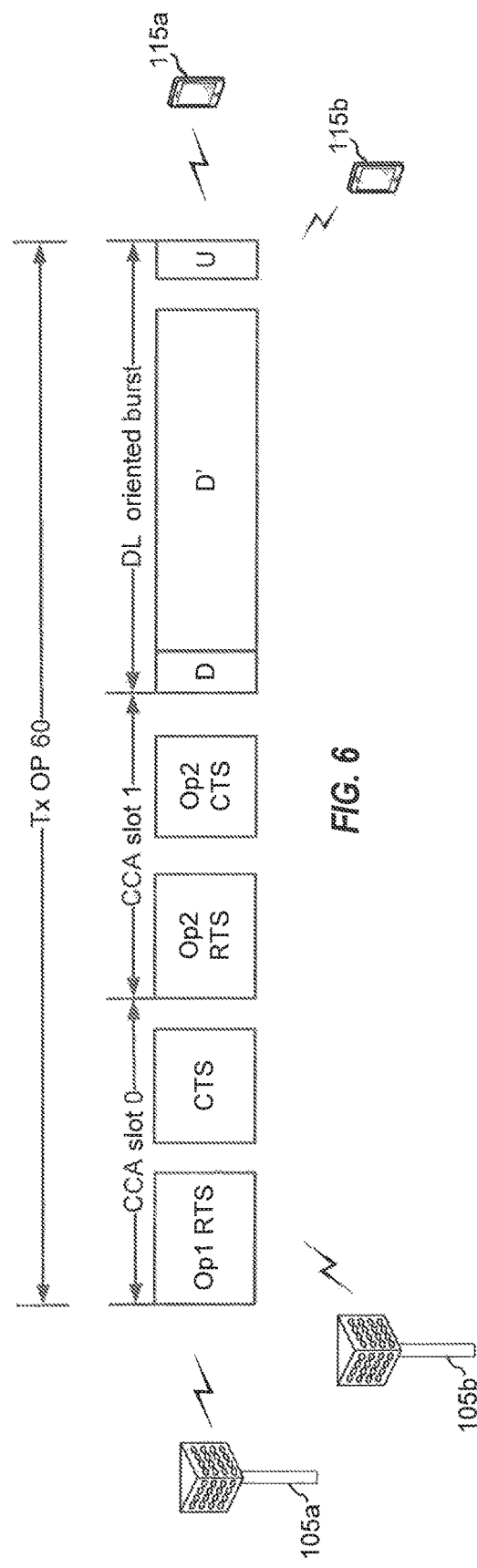

INTERFERENCE MANAGEMENT WITH COLORING CONCEPT

CROSS-REFERENCE TO RELATED APPLICATIONS

This application claims the benefit of U.S. Provisional Patent Application No. 62/417,815, entitled, "INTERFERENCE MANAGEMENT WITH COLORING CONCEPT," filed on Nov. 4, 2016, which is expressly incorporated by reference herein in its entirety.

BACKGROUND

Field

Aspects of the present disclosure relate generally to wireless communication systems, and more particularly, to interference management with a coloring concept.

Background

Wireless communication networks are widely deployed to provide various communication services such as voice, video, packet data, messaging, broadcast, and the like. These wireless networks may be multiple-access networks capable of supporting multiple users by sharing the available network resources. Such networks, which are usually multiple access networks, support communications for multiple users by sharing the available network resources. One example of such a network is the Universal Terrestrial Radio Access Network (UTRAN). The UTRAN is the radio access network (RAN) defined as a part of the Universal Mobile Telecommunications System (UMTS), a third generation (3G) mobile phone technology supported by the 3rd Generation Partnership Project (3GPP). Examples of multiple-access network formats include Code Division Multiple Access (CDMA) networks, Time Division Multiple Access (TDMA) networks, Frequency Division Multiple Access (FDMA) networks, Orthogonal FDMA (OFDMA) networks, and Single-Carrier FDMA (SC-FDMA) networks.

A wireless communication network may include a number of base stations or node Bs that can support communication for a number of user equipments (UEs). A UE may communicate with a base station via downlink and uplink, The downlink (or forward link) refers to the communication link from the base station to the UE, and the uplink (or reverse link) refers to the communication link from the UE to the base station.

A base station may transmit data and control information on the downlink to a UE and/or may receive data and control information on the uplink from the UE. On the downlink, a transmission from the base station may encounter interference due to transmissions front neighbor base stations or from other wireless radio frequency (RE) transmitters. On the uplink, a transmission from the UE may encounter interference from. uplink transmissions of other UEs communicating with the neighbor base stations or from other wireless RF transmitters. This interference may degrade performance on both the downlink and uplink.

As the demand for mobile broadband access continues to increase, the possibilities of interference and congested networks grows with more UEs accessing the long-range wireless communication networks and more short-range wireless systems being deployed in communities. Research and development continue to advance the UMTS technologies not only to meet the growing demand for mobile broadband access, but to advance and enhance the user experience with mobile communications.

SUMMARY

In one aspect of the disclosure, a method of wireless communication includes obtaining, by a target transmitter, a first priority schedule for a transmission opportunity of the target transmitter, wherein the first priority schedule identifies transmission priority for a plurality of base station groups, wherein each of the plurality of base station groups includes one or more base stations grouped according to one or more transmission criteria, identifying, at the target transmitter, data for transmission, monitoring, by the target transmitter, medium sensing slots corresponding to each of the plurality of base station groups for a medium reservation signal, determining a highest priority medium reservation signal out of any medium reservation signals detected during the monitoring, wherein the highest priority medium reservation signal is determined according to the first priority schedule, and transmitting the data by the target transmitter when the highest priority medium reservation signal corresponds to the target transmitter.

In an additional aspect of the disclosure, an apparatus configured for wireless communication, includes means for obtaining, by a target transmitter, a first priority schedule for a transmission opportunity of the target transmitter, wherein the first priority schedule identifies transmission priority for a plurality of base station groups, wherein each of the plurality of base station groups includes one or more base stations grouped according to one or more transmission criteria, means for identifying, at the target transmitter, data for transmission, means for monitoring, by the target transmitter, medium sensing slots corresponding to each of the plurality of base station groups for a medium reservation signal, means for determining a highest priority medium reservation signal out of any medium reservation signals detected during the monitoring, wherein the highest priority medium reservation signal is determined according to the first priority schedule, and means for transmitting the data by the target transmitter when the highest priority medium reservation signal corresponds to the target transmitter.

In an additional aspect of the disclosure, a non-transitory computer-readable medium having program code recorded thereon. The program code further includes code to obtain, by a target transmitter, a first priority schedule for a transmission opportunity of the target transmitter, wherein the first priority schedule identifies transmission priority for a plurality of base station groups, wherein each of the plurality of base station groups includes one or more base stations grouped according to one or more transmission criteria, code to identify, at the target transmitter, data for transmission, code to monitor, by the target transmitter, medium sensing slots corresponding to each of the plurality of base station groups for a medium reservation signal, code to determine a highest priority medium reservation signal out of any medium reservation signals detected during the monitoring, wherein the highest priority medium reservation signal is determined according to the first priority schedule, and code to transmit the data by the target transmitter when the highest priority medium reservation signal corresponds to the target transmitter.

In an additional aspect of the disclosure, an apparatus configured for wireless communication is disclosed. The apparatus includes at least one processor, and a memory coupled to the processor. The processor is configured to obtain, by a target transmitter, a first priority schedule for a transmission opportunity of the target transmitter, wherein the first priority schedule identifies transmission priority for a plurality of base station groups, wherein each of the plurality of base station groups includes one or more base stations grouped according to one or more transmission criteria, to identify, at the target transmitter, data for transmission, to monitor, by the target transmitter, medium sensing slots corresponding to each of the plurality of base station groups for a medium reservation signal, to determine a highest priority medium reservation signal out of any medium reservation signals detected during the monitoring, wherein the highest priority medium reservation signal is determined according to the first priority schedule, and to transmit the data by the target transmitter when the highest priority medium reservation signal corresponds to the target transmitter.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purpose of illustration and description, and not as a definition of the limits of the claims.

BRIEF DESCRIPTION OF THE DRAWINGS

A further understanding of the nature and advantages of the present disclosure may be realized by reference to the following drawings. In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

FIG. 5 is a block diagram illustrating an eNB of a first operator and an eNB of a second operator with a transmission opportunity in a network operating NR-SS without dynamic TDD per operator.

FIG. 6 is a block diagram illustrating an eNB of a first operator and an eNB of a second operator with a transmission opportunity in a network operating NR-SS without dynamic TDD per operator.

DETAILED DESCRIPTION

Figure 1:
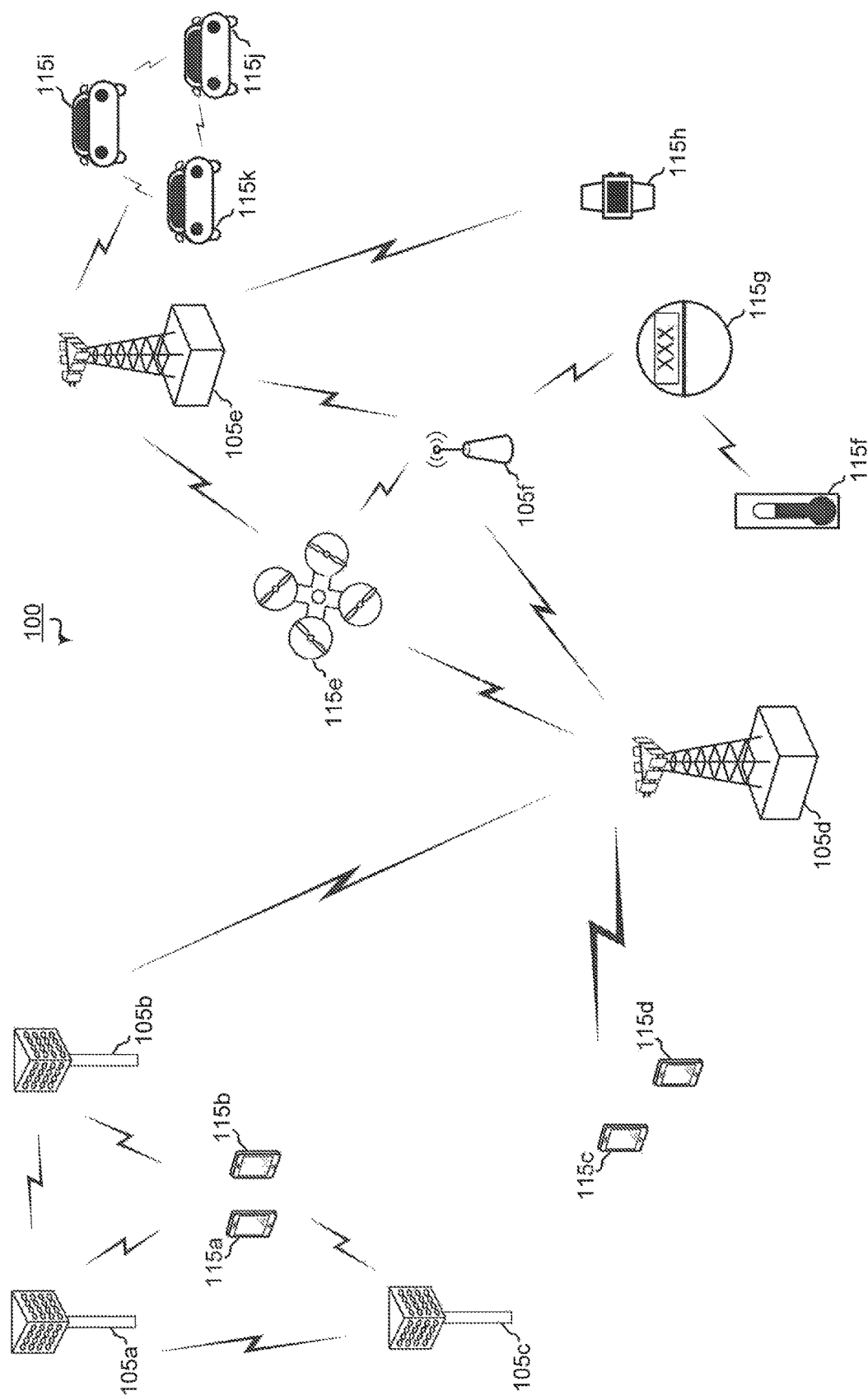
FIG. 1 is a block diagram illustrating details of a wireless communication system.

The detailed description set forth below, in connection with the appended drawings, is intended as a description of various configurations and is not intended to limit the scope of the disclosure. Rather, the detailed description includes specific details for the purpose of providing a thorough understanding of the inventive subject matter. it will be apparent to those skilled in the art that these specific details are not required in every case and that, in some instances, well-known structures and components are shown in block diagram form for clarity of presentation.

This disclosure relates generally to providing or participating in authorized shared access between two or more wireless communications systems, also referred to as wireless communications networks. In various embodiments, the techniques and apparatus may be used for wireless communication networks such as code division multiple access (CDMA) networks, time division multiple access (TDMA) networks, frequency division multiple access (FDMA) networks, orthogonal FDMA (OFDMA) networks, single-carrier FDMA (SC-FDMA) networks, LTE networks, GSM networks, as well as other communications networks. As described herein, the terms "networks" and "systems" may be used interchangeably.

An OFDMA network may implement a radio technology such as evolved UTRA (E-UTRA), IEEE 802.11, IEEE 802.16, IEEE 802.20, flash-OFDM and the like, UTRA, E-UTRA, and Global System for Mobile Communications (GSM) are part of universal mobile telecommunication system (UMTS). In particular, long term evolution (LTE) is a release of UMTS that uses E-UTRA. UTRA, E-UTRA, GSM, UMTS and LTE are described in documents provided from an organization named "3rd Generation Partnership Project" (3GPP), and cdma2000 is described in documents from an organization named "3rd Generation Partnership Project 2" (3GPP2). These various radio technologies and standards are known or are being developed. For example, the 3rd Generation Partnership Project (3GPP) is a collaboration between groups of telecommunications associations that aims to define a globally applicable third generation (3G) mobile phone specification. 3GPP long term evolution (LTE) is a 3GPP project which was aimed at improving the universal mobile telecommunications system (UMTS) mobile phone standard. The 3GPP may define specifications for the next generation of mobile networks, mobile systems, and mobile devices. The present disclosure is concerned with the evolution of wireless technologies from LTE, 4G, 5G, and beyond with shared access to wireless spectrum between networks using a collection of new and different radio access technologies or radio air interfaces.

In particular, 5G networks contemplate diverse deployments, diverse spectrum, and diverse services and devices that may be implemented using an OFDM-based unified, air interface. In order to achieve these goals, further enhancements to LTE and LTE-A are considered in addition to development of a new radio (NR) technology. The 5G NR will he capable of scaling to provide coverage (1) to a massive Internet of things (IoTs) with an ultra-high density (e.g., ~1 M nodes/km2), ultra-low complexity (e.g., ~10 s of bits/sec), ultra-low energy (e.g., ~10+ years of battery life), and deep coverage with the capability to reach challenging locations; (2) including mission-critical control with strong security to safeguard sensitive personal, financial, or classified information, ultra-high reliability (e.g., ~99.9999% reliability), ultra-low latency (e.g., 1 ms), and users with wide ranges of mobility or lack thereof; and (3) with enhanced mobile broadband including extreme high capacity (e.g., ~10 Tbps/km$^2$), extreme data rates (e.g., multi-Gbps rate, 100+ Mbps user experienced rates), and deep awareness with advanced discovery and optimizations.

The 5G NR may be implemented to use optimized OFDM-based waveforms with scalable numerology and transmission time interval (TTI); having a common, flexible framework to efficiently multiplex services and features with a dynamic, low-latency time division duplex (TDD)/frequency division duplex (FDD) design; and with advanced wireless technologies, such as massive multiple input, multiple output (MIMO), robust millimeter wave (mmWave) transmissions, advanced channel coding, and device-centric mobility. Scalability of the numerology in 5G NR, with scaling of subcarrier spacing, may efficiently address operating diverse services across diverse spectrum and diverse deployments. For example, in various outdoor and macro coverage deployments of less than 3 GHz FDD/TDD implementations, subcarrier spacing may occur with 15 kHz, for example over 1, 5, 10, 20 MHz, and the like bandwidth. For other various outdoor and small cell coverage deployments of TDD greater than 3 GHz, subcarrier spacing may occur with 30 kHz over 80/100 MHz bandwidth. For other various indoor wideband implementations, using a TDD over the unlicensed portion of the 5 GHz hand, the subcarrier spacing may occur with 60 kHz over a 160 MHz bandwidth. Finally, for various deployments transmitting with mmWave components at a TDD of 28 GHz, subcarrier spacing may occur with 120 kHz over a 500 MHz bandwidth.

The scalable numerology of the 5G NR facilitates scalable TTI for diverse latency and quality of service (QoS) requirements. For example, shorter TTI may be used for low latency and high reliability, while longer TTI may be used for higher spectral efficiency. The efficient multiplexing of long and short TTIs to allow transmissions to start on symbol boundaries. 5G NR also contemplates a self-contained integrated subframe design with uplink/downlink scheduling information, data, and acknowledgement in the same subframe. The self-contained integrated subframe supports communications in unlicensed or contention-based shared spectrum, adaptive uplink/downlink that may be flexibly configured on a per-cell basis to dynamically switch between uplink and downlink to meet the current traffic needs.

Various other aspects and features of the disclosure are further described below. It should be apparent that the teachings herein may be embodied in a wide variety of forms and that any specific structure, function, or both being disclosed herein is merely representative and not limiting. Based on the teachings herein one of an ordinary level of skill in the art should appreciate that an aspect disclosed herein may be implemented independently of any other aspects and that two or more of these aspects may be combined in various ways. For example, an apparatus may be implemented or a method may be practiced using any number of the aspects set forth herein. In addition, such an apparatus may be implemented or such a method may be practiced using other structure, functionality, or structure and functionality in addition to or other than one or more of the aspects set forth herein. For example, a method may be implemented as part of a system, device, apparatus, and/or as instructions stored on a computer readable medium for execution on a processor or computer. Furthermore, an aspect may comprise at least one element of a claim.

FIG. 1 is a block diagram illustrating 5G network 100 including various base stations and UEs configured according to aspects of the present disclosure. The 5G network 100 includes a number of evolved node Bs (eNBs) 105 and other network entities. An eNB may be a station that communicates with the UEs and may also be referred to as a base station, a an access point, and the like. Each eNB 105 may provide communication coverage for a particular geographic area. In 3GPP, the term "cell" can refer to this particular geographic coverage area of an eNB and/or an eNB subsystem serving the coverage area, depending on the context in which the term is used.

An eNB may provide communication coverage for a macro cell or a small cell, such as a pico cell or a femto cell, and/or other types of cell. A macro cell generally covers a relatively large geographic area (e.g., several kilometers in radius) and may allow unrestricted access by UEs with service subscriptions with the network provider. A small cell, such as a pico cell, would generally cover a relatively smaller geographic area and may allow unrestricted access by UEs with service subscriptions with the network provider. A small cell, such as a femto cell, would also generally cover a relatively small geographic area (e.g., a home) and, in addition to unrestricted access, may also provide restricted access by UEs having an association with the femto cell (e.g., UEs in a closed subscriber group (CSG), UEs for users in the home, and the like). An eNB for a macro cell may be referred to as a macro eNB. eNB for a small cell may be referred to as a small cell eNB, a pico eNB, a femto eNB or a home eNB. In the example shown in FIG. 1, the eNBs 105$d$ and 105$e$ are regular macro eNBs, while eNBs 105$a$-105$c$ are macro eNBs enabled with one of 3 dimension (3D), full dimension (FD), or massive MIMO. eNBs 105$a$-105$c$ take advantage of their higher dimension MIMO capabilities to exploit 3D beamforming in both elevation and. azimuth beamforming to increase coverage and capacity. eNB 105$f$ is a small cell eNB which may be a home node or portable access point. An eNB may support one or multiple (e.g., two, three, four, and the like) cells.

The 5G network 100 may support synchronous or asynchronous operation. For synchronous operation, the eNBs may have similar frame timing, and transmissions from different eNBs may be approximately aligned in time, For asynchronous operation, the eNBs may have different frame timing, and transmissions from different eNBs may not be aligned in time.

The UEs 115 are dispersed throughout the wireless network 100, and each UE may he stationary or mobile. A UE may also be referred to as a terminal, a mobile station, a subscriber unit, a station, or the like. A UE may be a cellular phone, a personal digital assistant (PDA), a wireless modem, a wireless communication device, a handheld device, a tablet computer, a laptop computer, a cordless phone, a wireless local loop (WLL) station, or the like. UEs 115$a$-115$d$ are examples of mobile smart phone-type devices accessing 5G network 100. A UE may also be a machine specifically configured for connected communication, including machine type communication (MTC), enhanced MTC (eMTC), narrowband IoT (NB-IoT) and the like. UEs 115$e$-115$k$ are examples of various machines configured for communication that access 5G network 100. A UE may be able to communicate with any type of the eNBs, whether macro eNB, small cell, or the like. In FIG. 1, a lightning bolt (e.g., communication links) indicates wireless transmissions between a UE and a serving eNB, which is an eNB designated to serve the UE on the downlink. and/or uplink, or desired transmission between eNBs, and backhaul transmissions between eNBs.

In operation at 5G network 100, eNBs 105a-105c serve UEs 115a and 115b using 3D beamforming and coordinated spatial techniques, such as coordinated multipoint (COMP) or multi-connectivity. Macro eNB 105d performs backhaul communications with eNBs 105a-105c, as well as small cell, eNB 105f. Macro eNB 105d also transmits multicast services which are subscribed to and received by UEs 115c and 115d. Such multicast services may include mobile television or stream video, or may include other services for providing community information, such as weather emergencies or alerts, such as Amber alerts or gray alerts.

Figure 2:
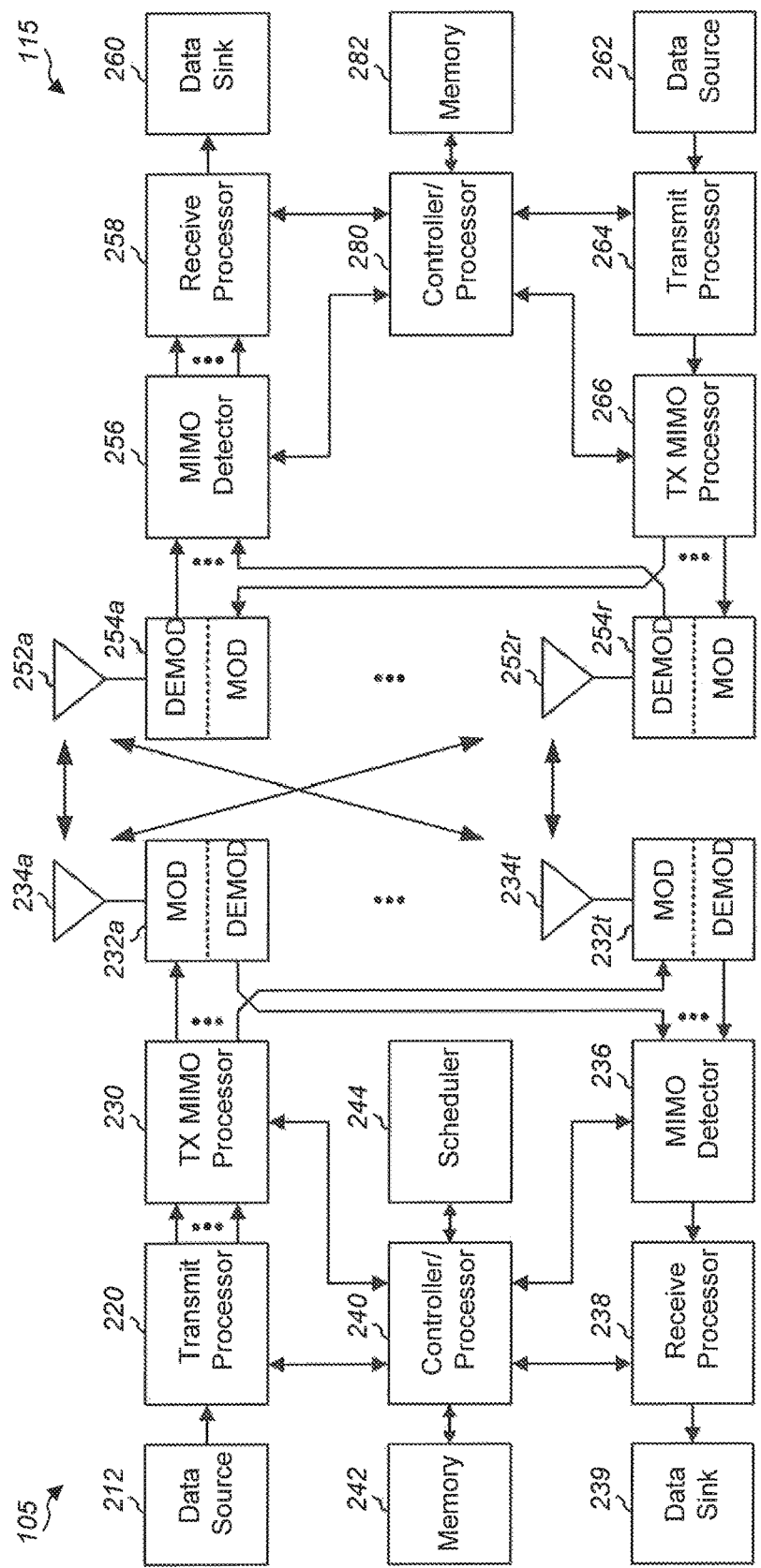
FIG. 2 is a block diagram illustrating a design of a base station/eNB and a UE configured according to one aspect of the present disclosure.

5G network 100 also support mission critical communications with ultra-reliable and redundant links for mission critical devices, such UE 115e, which is a drone. Redundant communication links with UE 115e include from macro eNBs 105d and 105e, as well as small cell eNB 105f. Other machine type devices, such as UE 115f (thermometer), UE 115g (smart meter), and UE 115h (wearable device) may communicate through 5G network 100 either directly with base stations, such as small cell eNB 105f, and macro eNB 105e, or in multi-hop configurations by communicating with another user device which relays its information to the network, such as UE 115f communicating temperature measurement information to the smart meter, UE 115g, which is then reported to the network through small cell eNB 105f. 5G network 100 may also provide additional network efficiency through dynamic, low-latency TM/MD communications, such as in a vehicle-to-vehicle (V2V) mesh network between UEs 115i-115k communicating with macro eNB 105e, FIG. 2 shows a block diagram of a design of a base station/eNB 105 and a UE 115, which may be one of the base stations/eNBs and one of the UEs in FIG. 1. At the eNB 105, a transmit processor 220 may receive data from a data source 212 and control information from a controller/processor 240. The control information may be for the PBCH, PCFICH, PHICH, PDCCH, EPDCCH, MPDCCH etc. The data may be for the PDSCH, etc. The transmit processor 220 may process (e.g., encode and symbol map) the data and control information to obtain data symbols and control symbols, respectively. The transmit processor 220 may also generate reference symbols, e.g., for the PSS, SSS, and cell-specific reference signal. A transmit (TX) multiple-input multiple-output (MIMO) processor 230 may perform spatial processing (e.g., precoding) on the data symbols, the control symbols, and/or the reference symbols, if applicable, and may provide output symbol streams to the modulators (MODs) 232a through 232t. Each modulator 232 may process a respective output symbol stream (e.g., for OFDM, etc.) to obtain an output sample stream. Each modulator 232 may further process (e.g., convert to analog, amplify, filter, and upconvert) the output sample stream to obtain a. downlink signal. Downlink signals from modulators 232a through 232t may be transmitted via the antennas 234a through 234t, respectively.

At the UE 115, the antennas 252a through 252r may receive the downlink signals from the eNB 105 and may provide received signals to the demodulators (DEM)Ds) 254a through 254r, respectively. Each demodulator 254 may condition (e.g., filter, amplify, downconvert, and digitize) a respective received signal to obtain input samples. Each demodulator 254 may further process the input samples (e.g., for OFDM, etc.) to obtain received symbols. A MIMO detector 256 may obtain received symbols from all the demodulators 254a through 254r, perform MIMO detection on the received symbols if applicable, and provide detected symbols. A receive processor 258 may process (e.g., demodulate, deinterleave, and decode) the detected symbols, provide decoded data for the UE 115 to a data sink 260, and provide decoded control information to a controller/processor 280.

On the uplink, at the UE 115, a transmit processor 264 may receive and process data (e.g., for the PUSCH) from a data source 262 and control information (e.g., for the PUCCH) from the controller/processor 280. The transmit processor 264 may also generate reference symbols for a reference signal. The symbols from the transmit processor 264 may be precoded by a TX MIMO processor 266 if applicable, further processed by the modulators 254a through 254r (e.g., for SC-FDM, etc.), and transmitted to the eNB 105. At the eNB 105, the uplink signals from the UE 115 may be received by the antennas 234, processed by the demodulators 232, detected by a MIMO detector 236 if applicable, and further processed by a receive processor 238 to obtain decoded data and control information sent by the UE 115. The processor 238 may provide the decoded data to a data sink 239 and the decoded control information to the controller/processor 240.

The controllers/processors 240 and 280 may direct the operation at the eNB 105 and the UE 115, respectively. The controller/processor 240 and/or other processors and modules at the eNB 105 may perform or direct the execution of various processes for the techniques described herein. The controllers/processor 280 and/or other processors and modules at the UE 115 may also perform or direct the execution of the functional blocks illustrated in FIG. 7, and/or other processes for the techniques described herein. The memories 242 and 282 may store data and program codes for the eNB 105 and the UE 115, respectively. A scheduler 244 may schedule UEs for data transmission on the downlink and/or uplink.

Wireless communications systems operated by different network operating entities (e.g., network operators) may share spectrum. In some instances, a network operating entity may be configured to use an entirety of a designated shared spectrum for at least a period of time before another network operating entity uses the entirety of the designated shared spectrum for a different period of time. Thus, in order to allow network operating entities use of the full designated shared spectrum, and in order to mitigate interfering communications between the different network operating entities, certain resources (e.g., time) may he partitioned and allocated to the different network operating entities for certain types of communication.

For example, a network operating entity may be allocated certain time resources reserved for exclusive communication by the network operating entity using the entirety of the shared spectrum. The network operating entity may also be allocated other time resources where the entity is given priority over other network operating entities to communicate using the shared spectrum. These time resources, prioritized for use by the network operating entity, may be utilized by other network operating entities on an opportunistic basis if the prioritized network operating entity does not utilize the resources. Additional time resources may be allocated for any network operator to use on an opportunistic basis.

Access to the shared spectrum and the arbitration of time resources among different network operating entities may be centrally controlled by a separate entity, autonomously determined by a predefined arbitration scheme, or dynamically determined based on interactions between wireless nodes of the network operators.

In some cases, UE 115 and base station 105 may operate in a shared radio frequency spectrum band, which may include licensed or unlicensed (e.g., contention-based) frequency spectrum. In an unlicensed frequency portion of the shared radio frequency spectrum band, UEs 115 or base stations 105 may traditionally perform a medium-sensing procedure to contend for access to the frequency spectrum. For example, UE 115 or base station 105 may perform a listen before talk (LBT) procedure such as a clear channel assessment (CCA) prior to communicating in order to determine whether the shared channel is available. A CCA may include an energy detection procedure to determine whether there are any other active transmissions. For example, a device may infer that a change in a received signal strength indicator (RSSI) of a power meter indicates that a channel is occupied. Specifically, signal power that is concentrated in a certain bandwidth and exceeds a predetermined noise floor may indicate another wireless transmitter. A CCA also may include detection of specific sequences that indicate use of the channel. For example, another device may transmit a specific preamble prior to transmitting a data sequence. In some cases, an LBT procedure may include a wireless node adjusting its own backoff window based on the amount of energy detected on a channel and/or the acknowledge/negative-acknowledge (ACK/NACK) feedback for its own transmitted packets as a proxy for collisions.

Use of a medium-sensing procedure to contend for access to an unlicensed shared spectrum may result in communication inefficiencies. This may be particularly evident when multiple network operating entities (e.g., network operators) are attempting to access a shared resource. In 5G network 100, base stations 105 and UEs 115 may be operated by the same or different network operating entities. In some examples, an individual base station 105 or UE 115 may be operated by more than one network operating entity. In other examples, each base station 105 and 115 may be operated by a single network operating entity. Requiring each base station 105 and UE 115 of different network operating entities to contend for shared resources may result in increased signaling overhead and communication latency.

Figure 3:
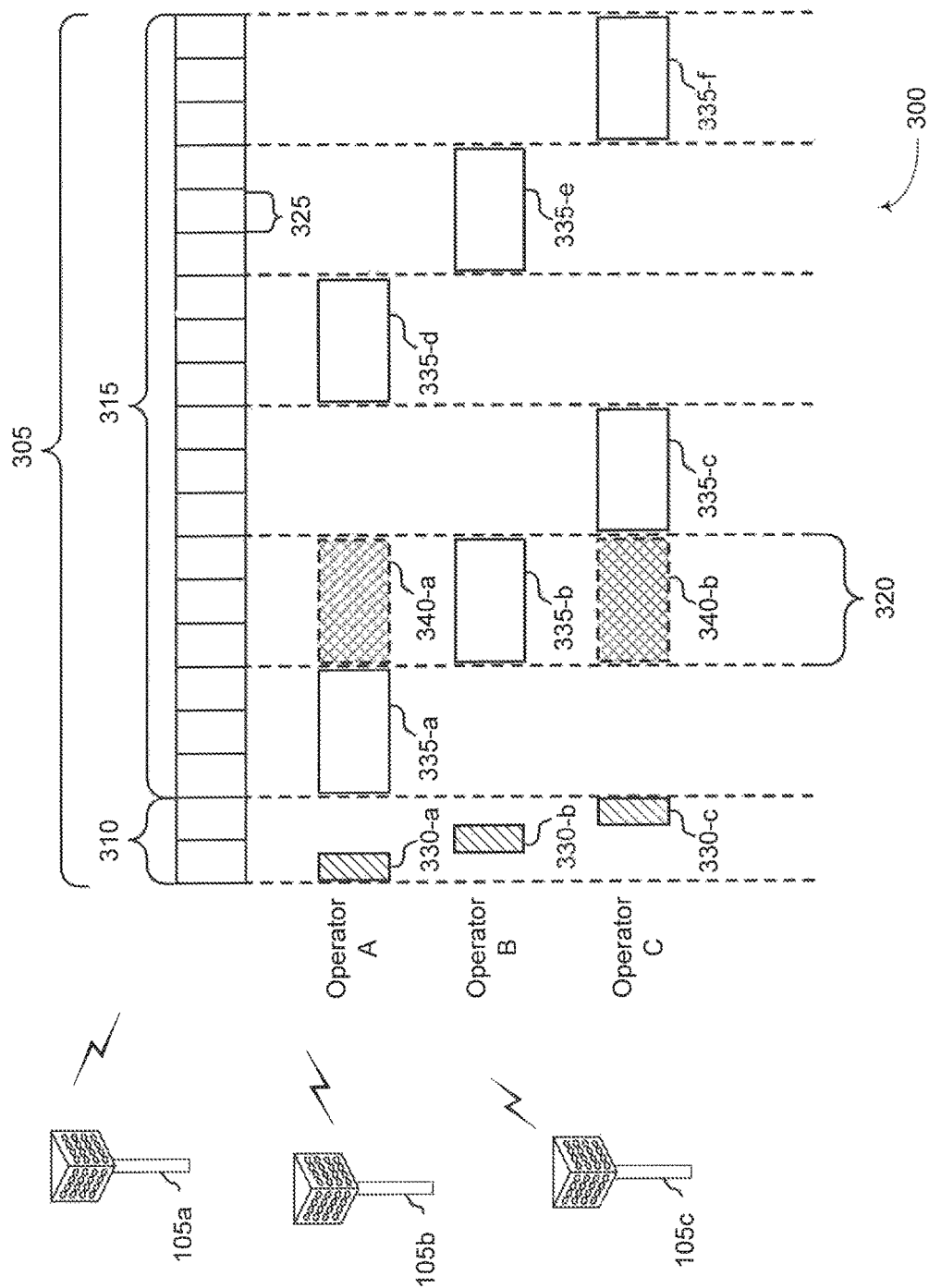
FIG. 3 illustrates an example of a timing diagram for coordinated resource partitioning.

FIG. 3 illustrates an example of a timing diagram 300 for coordinated resource partitioning. The timing diagram 300 includes a superframe 305, which may represent a fixed duration of time (e.g., 20 ms). Superframe 305 may be repeated for a given communication session and may be used by a wireless system such as 5G network 100 described with reference to FIG. 1. The superframe 305 may be divided into intervals such as an acquisition interval (A-INT) 310 and an arbitration interval 315. As described in more detail below, the A-INT 310 and arbitration interval 315 may be subdivided into sub-intervals, designated for certain resource types, and allocated to different network operating entities to facilitate coordinated communications between the different network operating entities. For example, the arbitration interval 315 may be divided into a plurality of sub-intervals 320. Also, the superframe 305 may be further divided into a plurality of subframes 325 with a fixed duration (e.g., 1 ms). While timing diagram 300 illustrates three different network operating entities (e.g., Operator A, Operator B, Operator C), the number of network. operating entities using the superframe 305 for coordinated communications may be greater than or fewer than the number illustrated in timing diagram 300.

The A-INT 310 may be a dedicated interval of the superframe 305 that is reserved for exclusive communications by the network operating entities. In some examples, each network operating entity may be allocated certain resources within the A-INT 310 for exclusive communications. For example, resources 330-a may be reserved for exclusive communications by Operator A, such as through base station 105a, resources 330-b may be reserved for exclusive communications by Operator B, such as through base station 105b, and resources 330-c may be reserved for exclusive communications by Operator C, such as through base station 105c. Since the resources 330-a are reserved for exclusive communications by Operator A, neither Operator B nor Operator C can communicate during resources 330-a, even if Operator A chooses not to communicate during those resources. That is, access to exclusive resources is limited to the designated network operator. Similar restrictions apply to resources 330-b for Operator B and resources 330-c for Operator C. The wireless nodes of Operator A (e.g, URs 115 or base stations 105) may communicate any information desired during their exclusive resources 330-a, such as control information or data.

When communicating over an exclusive resource, a network operating entity does not need to perform any medium sensing procedures (e.g., listen-before-talk (LBT) or clear channel assessment (CCA)) because the network operating entity knows that the resources are reserved. Because only the designated network operating entity may communicate over exclusive resources, there may be a reduced likelihood of interfering communications as compared to relying on medium sensing techniques alone (e.g., no hidden node problem). In some examples, the A-INT 310 is used to transmit control information, such as synchronization signals (e.g., SYNC signals), system information (e.g., system information blocks (SIBs)), paging information (e.g., physical broadcast channel (PBCH) messages), or random access information (e.g., random access channel (RACH) signals). In some examples, all of the wireless nodes associated with a network operating entity may transmit at the same time during their exclusive resources.

In some examples, resources may be classified as prioritized for certain network operating entities. Resources that are assigned with priority for a certain network operating entity may be referred to as a guaranteed interval (G-INT) for that network operating entity. The interval of resources used by the network operating entity during the G-INT may be referred to as a prioritized sub-interval, For example, resources 335-a may be prioritized for use by Operator A and may therefore be referred to as a G-INT for Operator A (e.g., G-INT-OpA). Similarly, resources 335-b may be prioritized for Operator B, resources 335-c may be prioritized for Operator C, resources 335-d may be prioritized for Operator A, resources 335-e may he prioritized for Operator B, and resources 335-f may be prioritized for operator C.

The various &INT resources illustrated in FIG. 3 appear to be staggered to illustrate their association with their respective network operating entities, but these resources may all be on the same frequency bandwidth. Thus, if viewed along a time-frequency grid, the G-INT resources may appear as a contiguous line within the superframe 305. This partitioning of data may be an example of time division multiplexing (TDM). Also, when resources appear in the same sub-interval (e.g., resources 340-a and resources 335-b), these resources represent the same time resources with respect to the superframe 305 (e.g., the resources occupy the same sub-interval 320), but the resources are separately designated to illustrate that the same time resources can be classified differently for different operators.

When resources are assigned with priority for a certain network operating entity (e.g., a G-INT), that network operating entity may communicate using those resources without having to wait or perform any medium sensing procedures (e.g., LBT or CCA). For example, the wireless nodes of Operator A are free to communicate any data or control information during resources 335-*a* without interference from the wireless nodes of Operator B or Operator C.

A network operating entity may additionally signal to another operator that it intends to use a particular G-INT. For example, referring to resources 335-*a*, Operator A may signal to Operator B and Operator C that it intends to use resources 335-*a*. Such signaling may be referred to as an activity indication. Moreover, since Operator A has priority over resources 335-*a*, Operator A may be considered as a higher priority operator than both Operator B and Operator C. However, as discussed above, Operator A does not have to send signaling to the other network operating entities to ensure interference-free transmission during resources 335-*a* because the resources 335-*a* are assigned with priority to Operator A.

Similarly, a network operating entity may signal to another network operating entity that it intends not to use a particular G-INT. This signaling may also be referred to as an activity indication. For example, referring to resources 335-*b*, Operator B may signal to Operator A and Operator C that it intends not to use the resources 335-*b* for communication, even though the resources are assigned with priority to Operator B. With reference to resources 335-*b*, Operator B may be considered a higher priority network operating entity than Operator A and Operator C. In such cases, Operators A and C may attempt to use resources of sub-interval 320 on an opportunistic basis. Thus, from the perspective of Operator A, the sub-interval 320 that contains resources 335-*b* may be considered an opportunistic interval (O-INT) for Operator A (e.g., O-INT-OpA). For illustrative purposes, resources 340-*a* may represent the O-INT for Operator A. Also, from the perspective of Operator C, the same sub-interval 320 may represent an O-INT for Operator C with corresponding resources 340-*b*. Resources 340-*a*, 335-*b*, and 340-*b* all represent the same time resources (e.g., a particular sub-interval 320), but are identified separately to signify that the same resources may be considered as a G-INT for some network operating entities and yet as an O-INT for others.

To utilize resources on an opportunistic basis, Operator A and Operator C may perform medium-sensing procedures to check for communications on a particular channel before transmitting data. For example, if Operator B decides not to use resources 335-*b* (e.g., G-INT-OpB), then Operator A may use those same resources (e.g., represented by resources 340-*a*) by first checking the channel for interference (e.g., LBT) and then transmitting data if the channel was determined to be clear. Similarly, if Operator C wanted to access resources on an opportunistic basis during sub-interval 320 (e.g., use an O-INT represented by resources 340-*b*) in response to an indication that Operator B was not going to use its G-INT, Operator C may perform a medium sensing procedure and access the resources if available. In some cases, two operators (e.g., Operator A and Operator C) may attempt to access the same resources, in which case the operators may employ contention-based procedures to avoid interfering communications. The operators may also have sub-priorities assigned to them designed to determine which operator may gain access to resources if more than operator is attempting access simultaneously.

In some examples, a network operating entity may intend not to use a particular G-INT assigned to it, but may not send out an activity indication that conveys the intent not to use the resources. In such cases, for a particular sub-interval 320, lower priority operating entities may be configured to monitor the channel to determine whether a higher priority operating entity is using the resources. If a lower priority operating entity determines through LBT or similar method that a higher priority operating entity is not going to use its G-INT resources, then the lower priority operating entities may attempt to access the resources on an opportunistic basis as described above.

In some examples, access to a G-INT or O-INT may be preceded by a reservation signal (e.g., request-to-send (RTS)/clear-to-send (CTS)), and the contention window (CW) may be randomly chosen between one and the total number of operating entities.

In some examples, an operating entity may employ or be compatible with coordinated multipoint (CoMP) communications. For example an operating entity may employ CoMP and dynamic time division duplex (TDD) in a G-INT and opportunistic CoMP in an O-INT as needed.

In the example illustrated in FIG. 3, each sub-interval 320 includes a G-INT for one of Operator A, B, or C. However, in some cases, one or more sub-intervals 320 may include resources that are neither reserved for exclusive use nor reserved for prioritized use (e.g., unassigned resources). Such unassigned resources may be considered an O-INT for any network operating entity, and may be accessed on an opportunistic basis as described above.

In some examples, each subframe 325 may contain 14 symbols (e.g., 250-μs for 60 kHz tone spacing). These subframes 325 may be standalone, self-contained Interval-Cs (ITCs) or the subframes 325 may be a part of a long ITC. An ITC may be a self-contained transmission starting with a downlink transmission and ending with a uplink transmission. In some embodiments, an ITC may contain one or more subframes 325 operating contiguously upon medium occupation. In some cases, there may be a maximum of eight network operators in an A-INT 310 (e.g., with duration of 2 ms) assuming a 250-μs transmission opportunity.

Although three operators are illustrated in FIG. 3, it should be understood that fewer or more network operating entities may be configured to operate in a coordinated manner as described above. In some cases, the location of the G-INT, O-INT, or A-INT within superframe 305 for each operator is determined autonomously based on the number of network operating entities active in a system. For example, if there is only one network operating entity, each sub-interval 320 may be occupied by a G-INT for that single network operating entity, or the sub-intervals 320 may alternate between G-INTs for that network operating entity and O-INTs to allow other network operating entities to enter, If there are two network operating entities, the sub-intervals 320 may alternate between G-INTs for the first network operating entity and G-INTs for the second network operating entity. If there are three network operating entities, the G-INT and O-INTs for each network operating entity may be designed as illustrated in FIG. 3. If there are four network operating entities, the first four sub-intervals 320 may include consecutive G-INTs for the four network operating entities and the remaining two sub-intervals 320 may contain O-INTs. Similarly, if there are five network operating entities, the first five sub-intervals 320 may contain consecutive G-INTs for the five network operating entities and the remaining sub-interval 320 may contain an O-INT. If there are six network operating entities, all six sub-intervals 320 may include consecutive G-INTs for each network operating entity. It should be understood that these examples are for illustrative purposes only and that other autonomously determined interval allocations may be used.

It should be understood that the coordination framework described with reference to FIG. 3 is for illustration purposes only. For example, the duration of superframe 305 may be more or less than 20 ms. Also, the number, duration, and location of sub-intervals 320 and subframes 325 may differ from the configuration illustrated. Also, the types of resource designations (e.g., exclusive, prioritized, unassigned) may differ or include more or less sub-designations.

In current study of the interference management mechanisms with dynamic time division duplex (TDD), the design has generally focused on coordination between the cross link communications (e.g., downlink-to-uplink or uplink-to-downlink) to minimize interference. Dynamic TDD operates using priorities among the various network nodes. For example, priority schemes may predetermine a hierarchy between network operators, between network nodes within the same network operators, and between various transmission links or channels between the network nodes. The proposal for TDD management is to have a target receiver on the higher priority link send a reservation message while a transmitter on the lower priority link monitors the message and determines, based on the comparative priority, whether to yield the channel or not, accordingly. The reservation message could be a clear-to-send (CTS) message transmitted from a UE or eNB, or an overriding message transmitted from the UE or eNB, which may also serve as the UE or eNB reservation signal. It should be noted that the CTS or overriding message sent from the eNB could reuse the waveform as the downlink CSI-RS or uplink SRS. Similarly, the CTS or overriding message sent from a UE could also reuse the waveform as the downlink CSI-RS or the uplink SRS.

The TDD management proposal assumes the downlink-to-downlink interference and uplink-to-uplink interference are manageable without special consideration. This assumption may not yield the best system performance in a dense deployment where time division multiplex (TDM) among downlink-to-downlink or uplink-to-uplink may be beneficial. Based on the received CTS and the priority associated with each CTS, the target transmitter would honor the CTS and decide whether to transmit or yield accordingly. The priority of the CTS could be pre-negotiated or conveyed in the CTS itself, either implicitly via different time or frequency resources or explicitly in the CTS payload.

Figure 4:
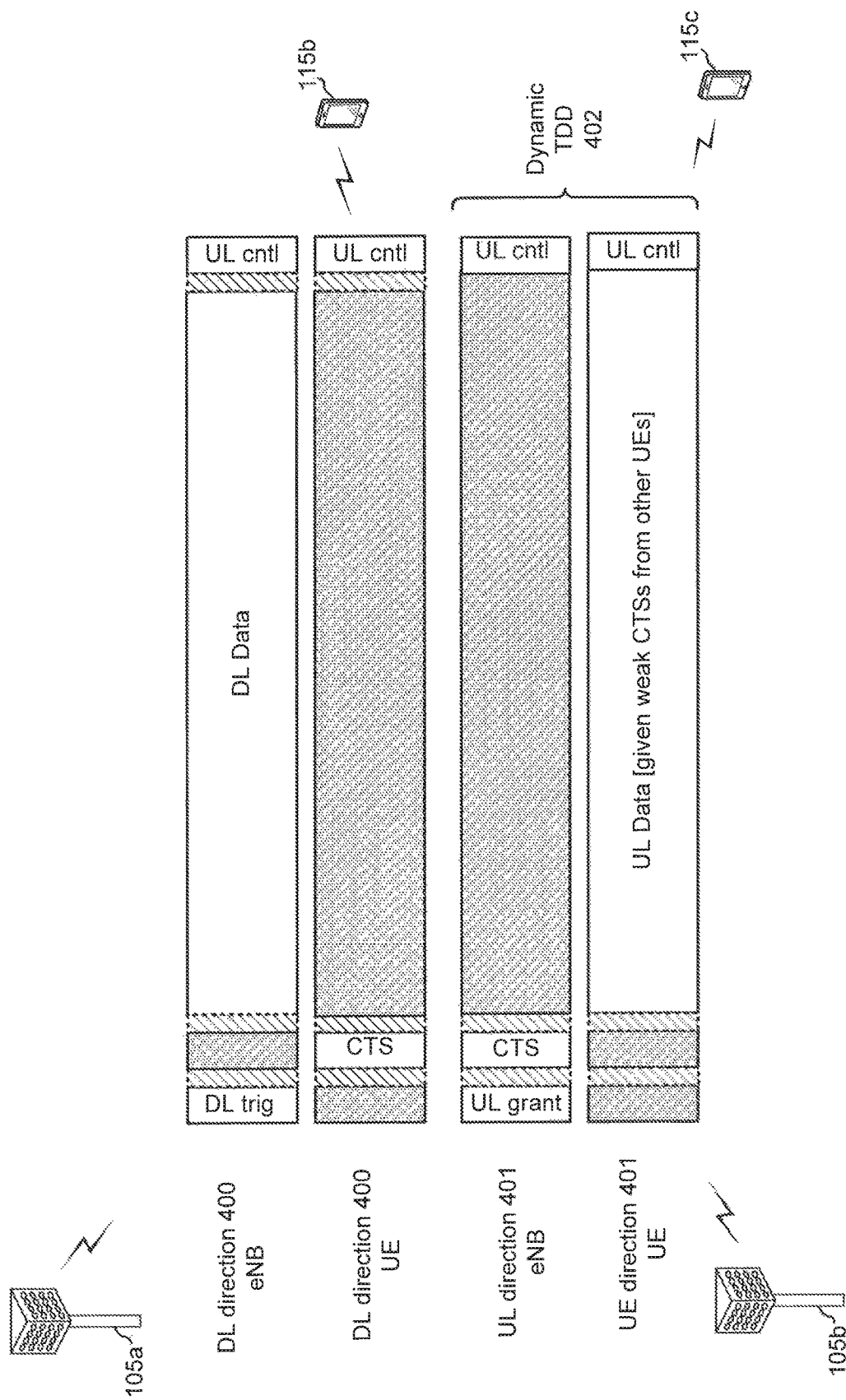
FIG. 4 is a block diagram illustrating eNBs serving UEs configured for dynamic TDD over shared spectrum.

FIG. 4 is a block diagram illustrating eNBs 105a and 105b serving UEs 115b and 115c configured for dynamic TDD over shared spectrum. As illustrated in FIG. 4, eNB 105a transmits a downlink trigger to 115b at the beginning of the transmission opportunity of downlink direction 400. At the same time, eNB 105b transmits an uplink grant to UE 115c in uplink direction 401. It should be noted that while separate blocks are illustrated for the eNB and UE communications over downlink direction 400 and uplink direction 401, these communications could occur over either the shared spectrum or the licensed spectrum. The communications via uplink direction 401 could make up dynamic TDD 402 communications over the shared or licensed spectrum, UE 115b, after detecting the downlink grant transmitted from eNB 105a, sends a CTS, which could be implemented as a sounding reference signal (SRS), a CSI-RS, or the like, operating as the reservation signal or CTS to eNB 105a for transmissions to UB 115b. Any other UEs that are communicating with eNB 105 may also send CTS signals at the same time as UE 115b.

Similarly, after sending the uplink grant in uplink direction 401, eNB 115b also transmits a CTS indicating to UE 115c a trigger to begin uplink communications. Without consideration of the priorities between eNB 105a and 105b or between UE 115b and 115c, eNB 105a will begin transmitting downlink data in downlink direction 400 to UE 115b while eNB 105b receives uplink data from 115c in uplink direction 401, The simultaneous downlink and uplink transmissions over the shared or licensed/guaranteed spectrum may cause interference to either of the transmissions (i.e., downlink-to-uplink interference and uplink-to-downlink interference). The last symbol of the transmission opportunity include uplink control, which, in downlink direction 400 would be preceded by a guard period after the downlink data transmission. This configuration of communications as illustrated in FIG. 4 provides an example of cross-link interference that occurs in operation of dynamic TDD.

FIG. 5 is a block diagram illustrating eNB 105a of a first operator and eNB 105b of a second operator with a transmission opportunity 50 in a network operating NR-SS without dynamic TDD per operator. Medium access management in the network illustrated in FIG. 5 uses a preamble structure to contend for access to the channel. As illustrated, the first operator has priority to the medium for transmission opportunity 50. In clear channel assessment (CCA) slot 0, eNB 105a of the first operator (Op1) will transmit a preamble to its transmission opportunity 50 if it has data for transmission. eNB 105b of the second operator remains silent during CCA slot 0 in order to detect a preamble from eNB 105a, In the illustrated example, eNB 105a has no data to transmit and, therefore, does not transmit a preamble in CCA slot 0. As such, eNB 105b will opportunistically take access to the channel for transmission opportunity 50 to transmit downlink data to UE 115b. eNB 105b transmit grants at downlink oriented burst, D, followed by transmission of the data at D'.

FIG. 6 is a block diagram illustrating eNB 105a of a first operator and eNB 105b of a second operator with a transmission opportunity 60 in a network operating NR-SS without dynamic TDD per operator. In the example illustrated in FIG. 6, medium access is managed through reservation signaling. Transmission opportunity 60 is divided into a CCA slot 0 reserved for the first operator, CCA slot 1 reserved for the second operator, and the downlink oriented burst region for downlink transmissions. In CCA slot 0, eNB 105a transmits a reservation signal, such as request-to-send (RTS). An RTS may typically include a preamble, either with or without payload, plus grant information or scheduling). The preamble in the RTS may also be used in the reservation signal example by other network operators to identify the medium occupancy. Within CCA slot 0, UE 115a of the first operator would send the confirmation reservation signal, e.g., CTS which would trigger eNB 105a to take possession of the channel for downlink transmissions. Similarly, in CCA slot 1, eNB 105b will transmit a reservation signal (Op2 RTS) and monitor for UE 115b of the second operator to send the confirmation signal (Op2 CTS). Depending on the priority relationship between the first and the second operators, the superior operator will take possession of the channel for transmission opportunity 60 by transmitting uplink or downlink grants at D and data via, for example, PDSCH, at D'. As indicated above, the last symbol of transmission opportunity 60 is for uplink control with a gap before, if the transmissions are downlink transmissions.

In design of the 5G NR, multiple medium access mechanisms have been suggested for use of shared spectrum with NR (NR-SS). The design focus is currently on the medium sharing among operators because, for nodes within the same operator, the TDD uplink/downlink configuration is typically synchronized among all of the nodes. Thus, there would be no dynamic TDD issue between nodes of the same operator once the operator wins access to the medium. However, while the synchronized uplink/downlink configuration may be valid for coordinated multi-point (CoMP) operations, each node within the same operator without CoMP may have different uplink/downlink configurations depending on the traffic pattern. Therefore, additional interference management mechanisms may be considered for implementation of dynamic TDD within an operator running NR-SS within its network.

In a dense deployment, even with a single operator, the system performance may be better or more robust when operated on a reuse factor of less than one even among network nodes of the same or different power classes. A medium access structure may be extended to NR-SS to achieve a reduced same link interference by dividing the eNBs into multiple groups, where each group has its own dedicated CCA slot within the transmission opportunity. The criteria for establishing the different groups may draw from various conditions, such as power class, traffic level, or the like, within the same operator, or with eNBs of different operators, groupings may be based on operator as well. Grouping of eNBs, including the number of groups to form can depend on UE measurement reports or eNB coordination. In operation, eNBs in different group will provide TDM operation between groups, while eNBs in the same group may transmit or receive with a reuse factor one, in which the eNBs may transmit without TDM or FDM.

Figure 7:
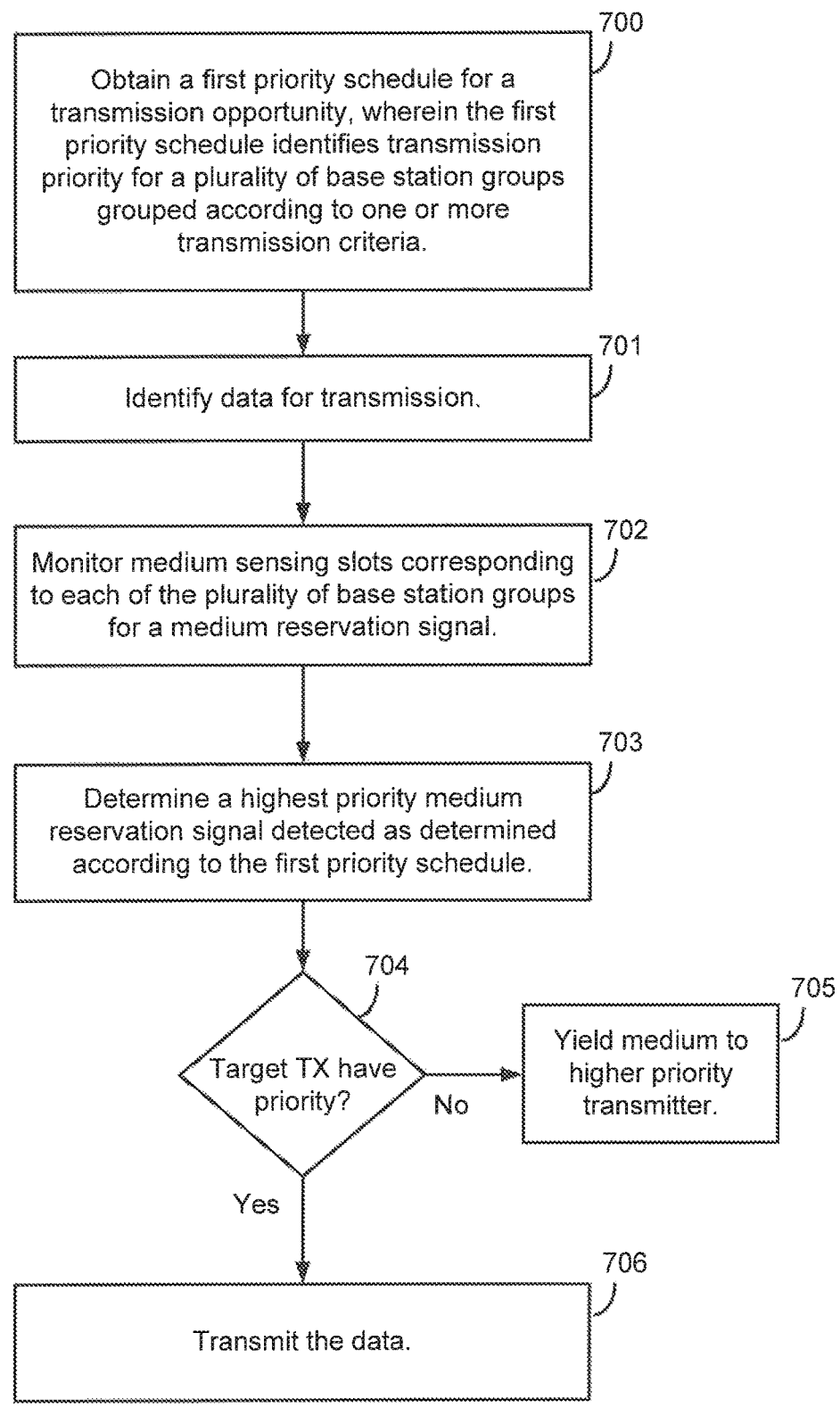
FIG. 7 is a block diagram illustrating example blocks executed to implement one aspect of the present disclosure.

FIG. 7 is a block diagram illustrating example blocks executed to implement one aspect of the present disclosure. At block 700, a target transmitter obtains a first priority schedule for a transmission opportunity of the target transmitter, wherein the first priority schedule identifies transmission priority for a plurality of base station groups, wherein each of the plurality of base station groups includes one or more base stations grouped according to one or more transmission criteria. At block 701, the target transmitter may identify data for transmission.

At block 702, the target transmitter monitors medium sensing slots corresponding to each of the plurality of base station groups for a medium reservation signal. For example, the network may assign specific slots to each group for transmitting medium reservation signals, such as CTS. At block 703, the target transmitter determines a highest priority medium reservation signal out of any medium reservation signals detected during the monitoring, wherein the highest priority medium reservation signal is determined according to the first priority schedule.

At block 704, a determination is made whether the highest priority medium reservation signal corresponds to the group in which the target transmitter is assigned. If not, then, at block 705, the target transmitter will yield the transmission medium to the higher priority transmitter. If the target transmitter is a member of the highest priority base station group, then, at block 706, the target transmitter transmits the data.

Figure 8:
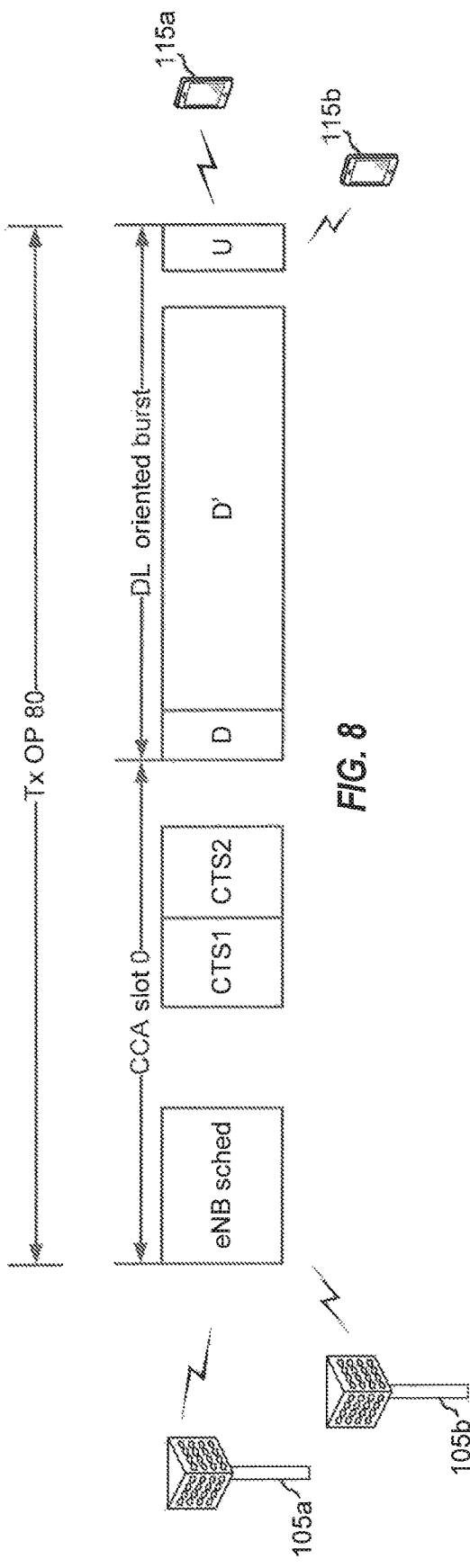
FIG. 8 is a block diagram illustrating eNBs and UEs configured according to one aspect of the present disclosure.

FIG. 8 is a block diagram illustrating eNBs 105a and 105b and UEs 115a and 115b configured according to one aspect of the present disclosure. eNBs 105a and 105b are both operated by the same network operator. However, because of the evaluation of certain transmission criteria, such as network density, geographic location, traffic load, user equipment measurement reports, and the like, the eNBs have been placed into different groups. As illustrated in FIG. 8, eNBs 105a and 105b are grouped into two separate groups. Because they are in the same network operator, eNBs 105a and 105b may transmit scheduling information to UEs 115a and 115b in CCA slot 0 using a reuse factor one. Each of the groups is assigned to a location within CCA slot 0 for transmitting a medium reservation signal, such as a CTS. In general, the CTS may carry priority information for determining the transmission priority of the transmission opportunity. While the example illustrated in FIG. 8 reflect CTS that are multiplexed according to TDM, various additional aspects of the present disclosure may multiplex the medium reservation signals according to FDM. eNBs 105a and 105b listen for the CTS signals for each of the groups, CTS1 and CTS2 and then determines whether to yield the medium or not based on the priority.

Each group can only send CTS on the specific CTS region corresponding to the particular group. If the target transmitter, such as eNB 105b detects CTS of higher priority nodes, it will determine whether it needs to yield or transmit. Since the control channel can sustain the same link interference, eNBs 105a and 105b only send scheduling information without including a preamble.

Figure 9:
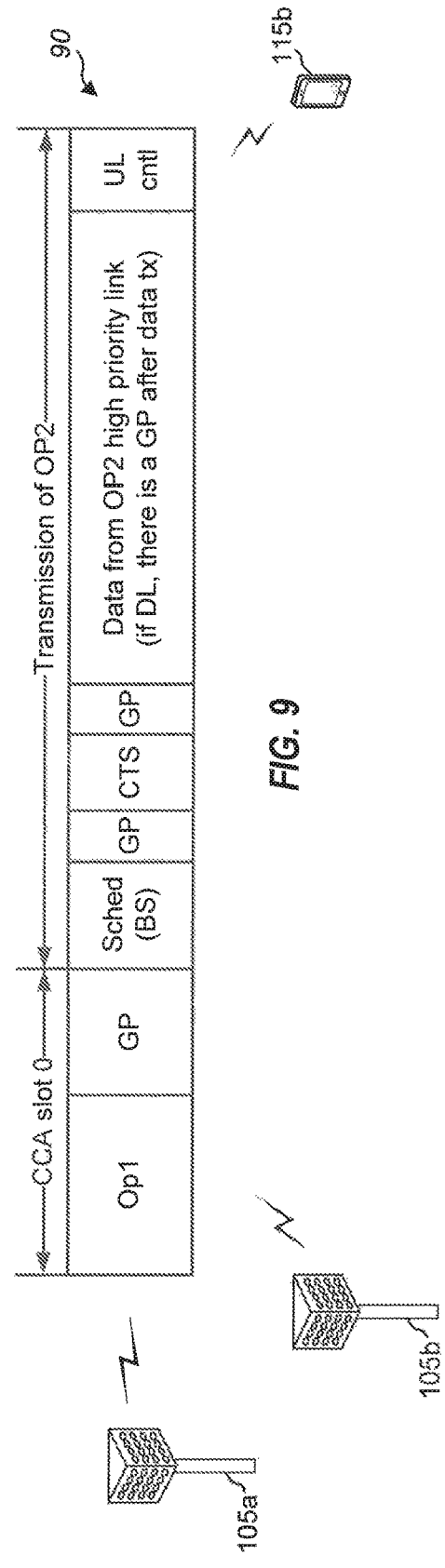
FIG. 9 is a block diagram illustrating eNBs and a UE configured according to one aspect of the present disclosure.

FIG. 9 is a block diagram illustrating eNBs 105a and 105b and UE 115b configured according to one aspect of the present disclosure, The preamble based NR-SS medium access structure may be extended to operations involving multiple network operators. eNB 105a is operated by the priority operator for the transmission opportunity 90. During CCA slot 0, eNB 105a may send a preamble for transmission opportunity 90. eNB 105b, which is operated by a lower priority network operator monitors for the preamble in CCA slot 0. In the example illustrated, eNB 105h fails to detect a preamble in CCA slot 0 and determines to access the medium for downlink transmission to UE 115b. Once a particular operator wins the medium, it can apply the dynamic TDD structure as in single operator scenarios. For example, after winning the medium for transmission opportunity 90, eNB 105h sends a transmission schedule. UE 115b transmits CTS which clears eNB 105b for transmitting downlink data to UE 115b.

Figure 10:
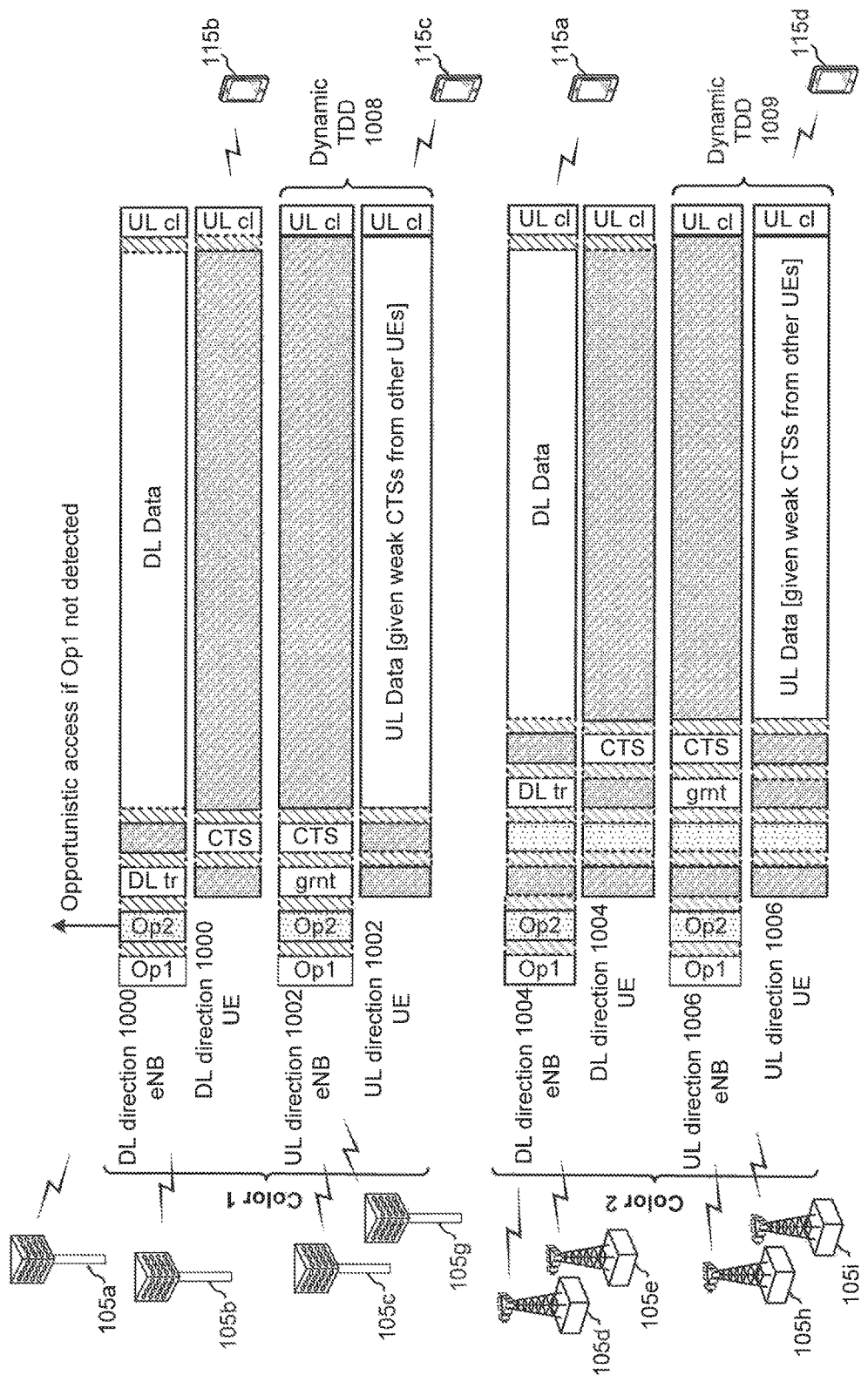
FIG. 10 is a block diagram illustrating eNBs and UEs configured according to one aspect of the present disclosure.

FIG. 10 is a block diagram illustrating eNBs 105a-105e, 105g-405i and UEs 105a-105d configured according to one aspect of the present disclosure. eNBs 105a, 105c, 105d, and 105h are operated by a first network operator, while eNBs 105b, 105g, 105e, and 105i are operated by a second network operator, In addition to belonging to two separate network operators, because of the density of deployment and HetNet scenario, the eNBs within the same operator have also been grouped according to power class, color 1 and color 2. eNBs 105a-105c, 105g each belong to the group color group 1, while eNBs 105d, 105e, 105h, and 105i each belong to the group color group 2.

Because groups color 1 and color 2 include eNBs from two different network operators, the priority of the operators is determined prior to determining any intra-operator priority to secure the medium for transmission. In the first symbol of downlink direction 1000 and uplink direction 1002 of group color 1, and downlink direction 1004 and uplink direction 1006 of group color 2, the first operator group eNBs, eNB 105a, 105c, 105d, and 105h transmit a preamble for transmission. The eNBs of the second operator group, eNBs 105b, 105g, 105e, and 105i listen for the preamble in the first symbol. Based on the preamble, the eNB may determine which operator will have access to the medium. It should be noted that the first operator group, if it decides to occupy the medium, may or may not a time instance for the second operator group.

In color 1, based on which operator secures the medium, a dynamic TDD 1008 may be provisioned with either one of eNBs 105c or 105g, depending on the operator. The eNB that secured the medium may send a downlink trigger in downlink direction 1000 to UE 115b. If the downlink trigger is sent, UE 115b may send a UE CTS signal in the form of an SRS, CSI-RS, or some other waveform in downlink direction 1000. In uplink direction 1002, based on the operator that secured the medium, an uplink grant is sent followed by an eNB CTS in the form of SRS or CSI-RS or other waveform from the winning eNB, eNB 105c or 105g, to 115c. If uplink direction 1002 has a lower priority than downlink direction 1000, UE 115c would begin uplink transmissions if it does not detect a UE CTS from UE 115b. Similarly, if the downlink direction 1000 has a lower priority, eNB 105c would start downlink transmission if it does not detect an eNB CTS from eNB 105g. In essence, the target transmitter, which could be either UEs or eNBs, monitors CTS from either a UE or eNB and, based on the CTS priority, the target transmitter can decided whether to transmit or yield the medium. As noted above, the CTS priority could be pre-negotiated or implicitly conveyed with different time and frequency resources or explicitly carried in the CTS payload. The target transmitter, when it detects the CTS for a high priority node will yield its transmission on the medium. It should further be noted that, if eNBs in color 1 decide to occupy the medium, they may transmit without leaving a time instances for the color 2 nodes to exchange downlink triggers and/or CTS.

In color 2, depending on which operator won access to the medium, the lower priority color 2 eNBs will listen for the signaling taking place from the color 1 network nodes. If no signaling identifying transmission of downlink or uplink signals from the color 1 nodes is detected, the eNBs with priority to the medium will use the following symbols, for example, to transmit downlink triggers in downlink direction 1004 and a responding CTS from UE 115a. In uplink direction 1006, another dynamic TDD 1009 may be implemented by the winning eNB of either eNB 105h or 105i, which would transmit an uplink grant and a CTS to trigger UE 115d to begin uplink transmissions. The target transmitters, eNB 105h and UE 115d, monitor CTS sent from UE 115a and eNB 105i and, depending on the CTS associated with each link, decide to transmit or yield accordingly. Thus, within each group, the control signaling may be transmitted in the same symbols using a reuse factor one, while the data is multiplexed, and, between the groups, the control signaling of one group (e.g., color 1) is multiplexed with the control signaling of the other group (e.g., color 2).

Figure 11:
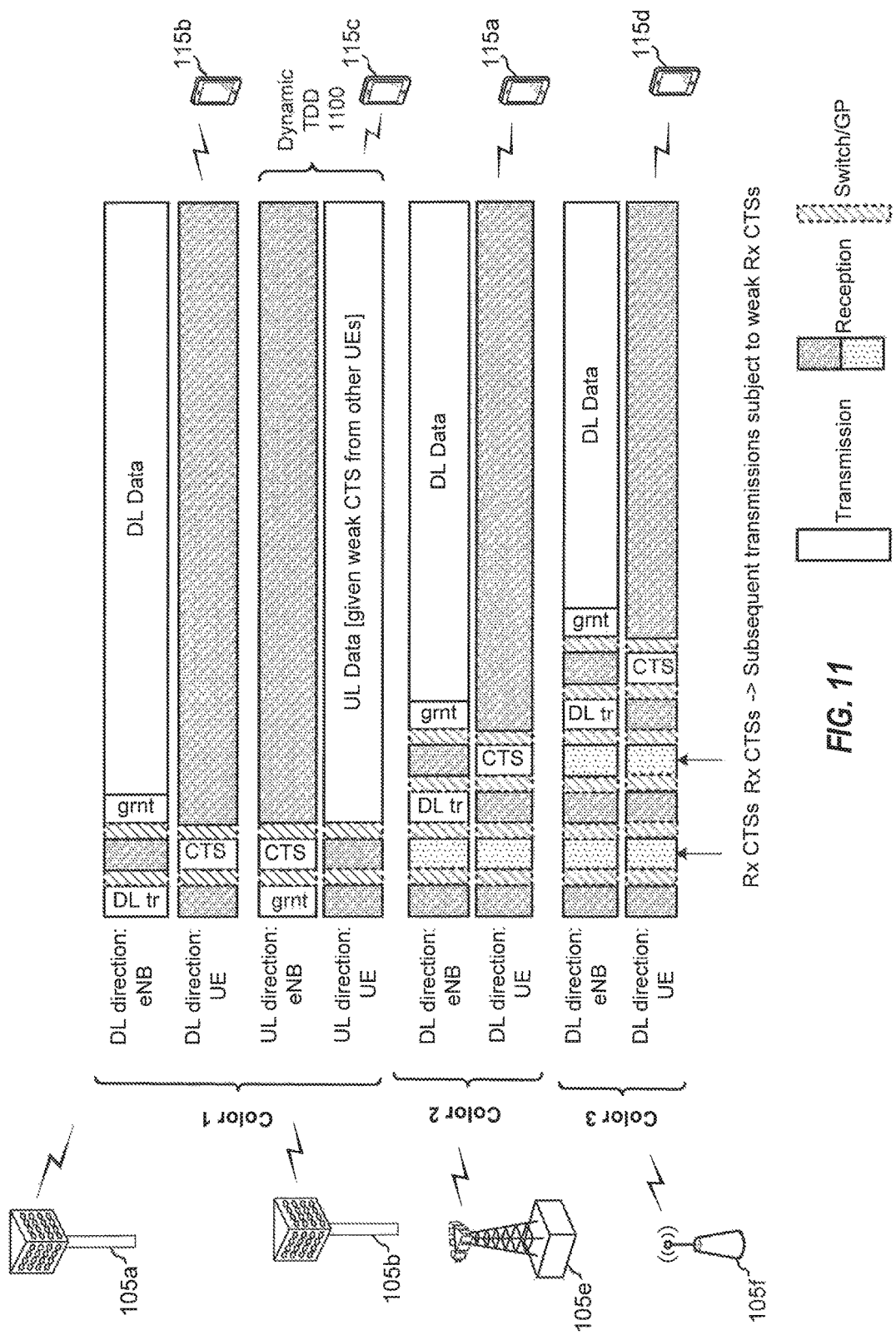
FIG. 11 is a block diagram illustrating eNBs and UEs configured according to one aspect of the present disclosure.

FIG. 11 is a block diagram illustrating eNBs 105a, 105b, 105e, and 105f and UEs 115a-115d, configured according to one aspect of the present disclosure. The example aspect illustrated in FIG. 11 includes three separate groups, color 1-3, of eNBs grouped according to power class. As with the operation described with respect to FIG. 10, within the groups, the control signaling may be transmitted with a reuse factor of 1, while the data, for dynamic TDD 1100 between the downlink and uplink directions are determined by link priority. Between the groups, each lower priority group listens for the medium reserving signals of the higher priority groups in the resource locations known for those higher priority groups. Once each lower priority group determines that the medium has not been reserved by the higher priority group, it will secure the channel for transmission, and with the transmission, there could be dynamic TDD management between the downlink and uplink directions.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The functional blocks and modules in FIG. 7 may comprise processors, electronics devices, hardware devices, electronics components, logical circuits, memories, software codes, firmware codes, etc., or any combination thereof.

Those of skill would further appreciate that the various illustrative logical blocks, modules, circuits, and algorithm steps described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure. Skilled artisans will also readily recognize that the order or combination of components, methods, or interactions that are described herein are merely examples and that the components, methods, or interactions of the various aspects of the present disclosure may be combined or performed in ways other than those illustrated and described herein.

The various illustrative logical blocks, modules, and circuits described in connection. with the disclosure herein may be implemented or performed with a general-purpose processor, a digital signal processor (DSP), an application specific integrated circuit (ASIC), a field programmable gate array (FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the disclosure herein may be embodied directly in hardware, in a software module executed by a processor, or in a combination of the two, A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary designs, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. Computer-readable storage media may be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, a connection may be properly termed a computer-readable medium. For example, if the software is transmitted from a website, server, or other remote source using a coaxial cable, fiber optic cable, twisted pair, or digital subscriber line (DSL), then the coaxial cable, fiber optic cable, twisted pair, or DSL, are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

As used herein, including in the claims, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination. Also, as used herein, including in the claims, "or" as used in a list of items prefaced by "at least one of" indicates a disjunctive list such that, for example, a list of "at least one of A, B, or C" means A or B or C or AB or AC or BC or ABC (i.e., A and B and C) or any of these in any combination thereof The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein but is to be accorded the widest scope consistent with the principles and novel features disclosed herein.

What is claimed is:

1. A method of wireless communication, comprising:
   obtaining, by a target transmitter, a first priority schedule for a transmission opportunity of the target transmitter, wherein the first priority schedule identifies transmission priority for a plurality of base station groups, wherein each of the plurality of base station groups includes one or more base stations grouped according to one or more transmission criteria;
   identifying, at the target transmitter, data for transmission;
   monitoring, by the target transmitter, medium sensing slots corresponding to each of the plurality of base station groups for a medium reservation signal;
   determining a highest priority medium reservation signal out of any medium reservation signals detected during the monitoring, wherein the highest priority medium reservation signal is determined according to the first priority schedule; and
   transmitting the data by the target transmitter when the highest priority medium reservation signal corresponds to the target transmitter.

2. The method of claim 1, wherein the target transmitter includes one of:
   a base station within the plurality of base station groups; or
   a user equipment (UE) in communication with at least one base station within the plurality of base station groups.

3. The method of claim 1, further including:
   refraining from transmission of the data by the target transmitter when the highest priority medium corresponds to a transmitter other than the target transmitter.

4. The method of claim 1, wherein the medium sensing slots corresponding to each of the plurality of base station groups are one of:
   time division multiplexed; or
   frequency division multiplexed onto the transmission opportunity.

5. The method of claim 1, wherein a priority for the medium reservation signal of the first priority schedule is conveyed via one of:
   different time resources;
   different frequency resources; or
   explicit payload.

6. The method of claim 1, wherein a transmission schedule for one or more base stations in each of the plurality of base station groups is transmitted in a single slot associated with a corresponding group of the plurality of base station groups.

7. The method of claim 1, wherein the one or more transmission criteria include one or more of:
   power class;
   geographic location;
   traffic load; and
   user equipment measurement report.

8. The method of claim 1, further including:
   obtaining, by the target transmitter, a second priority schedule for the transmission opportunity, wherein the second priority schedule identifies transmission priority for a plurality of network operators;
   monitoring, by the target transmitter, one or more clear channel assessment (CCA) slots prior to the transmission opportunity for one or more operator preambles; and
   determining, by the target transmitter, a highest priority operator preamble detected during the monitoring the one or more CCA slots, wherein the highest priority operator preamble is determined according to the second priority schedule, wherein at least the monitoring the medium sensing slots, the determining the highest priority medium reservation signal, and the transmitting the data are performed in response to the highest priority operator preamble corresponding to a target network operator associated with the target transmitter.

9. The method of claim 8, wherein the one or more operator preambles is a single operator preamble of a highest priority operator and the one or more CCA slots is a single CCA slot assigned to the highest priority operator.

10. The method of claim 8, wherein each of the one or more CCA slots is assigned to a different network operator.

11. The method of claim 10, wherein the obtaining the second priority schedule includes:
receiving priority information from an operator reservation signal detected in each of the one or more CCA slots, wherein the operator reservation signal is sent in response to the one or more operator preambles.

12. An apparatus configured for wireless communication, comprising:
means for obtaining, by a target transmitter, a first priority schedule for a transmission opportunity of the target transmitter, wherein the first priority schedule identifies transmission priority for a plurality of base station groups, wherein each of the plurality of base station groups includes one or more base stations grouped according to one or more transmission criteria;
means for identifying, at the target transmitter, data for transmission;
means for monitoring, by the target transmitter, medium sensing slots corresponding to each of the plurality of base station groups for a medium reservation signal;
means for determining a highest priority medium reservation signal out of any medium reservation signals detected during the means for monitoring, wherein the highest priority medium reservation signal is determined according to the first priority schedule; and
means for transmitting the data by the target transmitter when the highest priority medium reservation signal corresponds to the target transmitter.

13. The apparatus of claim 12, wherein the target transmitter includes one of
a base station within the plurality of base station groups; or
a user equipment (UE) in communication with at least one base station within the plurality of base station groups.

14. The apparatus of claim 12, further including:
means for refraining from transmission of the data by the target transmitter when the highest priority medium corresponds to a transmitter other than the target transmitter.

15. The apparatus of claim 12, wherein the one or more transmission criteria. include one or more of:
power class;
geographic location;
traffic load; and
user equipment measurement report.

16. A non-transitory computer-readable medium having program code recorded thereon, the program code comprising:
program code executable by a computer for causing the computer to obtain, by a target transmitter, a first priority schedule for a transmission opportunity of the target transmitter, wherein the first priority schedule identifies transmission priority for a plurality of base station groups, wherein each of the plurality of base station groups includes one or more base stations grouped according to one or more transmission criteria;
program code executable by the computer for causing the computer to identify, at the target transmitter, data for transmission;
program code executable by the computer for causing the computer to monitor, by the target transmitter, medium sensing slots corresponding to each of the plurality of base station groups for a medium reservation signal;
program code executable by the computer for causing the computer to determine a highest priority medium reservation signal out of any medium reservation signals detected during execution of the program code executable by the computer for causing the computer to monitor, wherein the highest priority medium reservation signal is determined according to the first priority schedule; and
program code executable by the computer for causing the computer to transmit the data by the target transmitter when the highest priority medium reservation signal corresponds to the target transmitter.

17. The non-transitory computer-readable medium of claim 16, wherein the target transmitter includes one of:
a base station within the plurality of base station groups; or
a user equipment (UE) in communication with at least one base station within the plurality of base station groups.

18. The non-transitory computer-readable medium of claim 16, further including:
program code executable by the computer for causing the computer to refrain from transmission of the data by the target transmitter when the highest priority medium corresponds to a transmitter other than the target transmitter.

19. The non-transitory computer-readable medium of claim 16, wherein the one or more transmission criteria include one or more of:
power class;
geographic location;
traffic load; and
user equipment measurement report.

20. An apparatus configured for wireless communication, the apparatus comprising:
at least one processor; and
a memory coupled to the at least one processor,
wherein the at least one processor is configured:
to obtain, by a target transmitter, a first priority schedule for a transmission opportunity of the target transmitter, wherein the first priority schedule identifies transmission priority for a plurality of base station groups, wherein each of the plurality of base station groups includes one or more base stations grouped according to one or more transmission criteria;
to identify, at the target transmitter, data for transmission;
to monitor, by the target transmitter, medium sensing slots corresponding to each of the plurality of base station groups for a medium reservation signal;
to determine a highest priority medium reservation signal out of any medium reservation signals detected during execution of the configuration of the at least one processor to monitor, wherein the highest priority medium reservation signal is determined according to the first priority schedule; and
to transmit the data by the target transmitter when the highest priority medium reservation signal corresponds to the target transmitter.

21. The apparatus of claim 20, wherein the target transmitter includes one of:
a base station within the plurality of base station groups; or
a user equipment (UE) in communication with at least one base station within the plurality of base station groups.

22. The apparatus of claim 20, further including configuration of the at least one processor to refrain from transmission of the data by the target transmitter when the highest priority medium corresponds to a transmitter other than the target transmitter.

23. The apparatus of claim 20, wherein the medium sensing slots corresponding to each of the plurality of base station groups are one of:
  time division multiplexed; or
  frequency division multiplexed onto the transmission opportunity.

24. The apparatus of claim 20, wherein a priority for the medium reservation signal of the first priority schedule is conveyed via one of:
  different time resources;
  different frequency resources; or
  explicit payload.

25. The apparatus of claim 20, wherein a transmission schedule for one or more base stations in each of the plurality of base station groups is transmitted in a single slot associated with a corresponding group of the plurality of base station groups.

26. The apparatus of claim 20, wherein the one or more transmission criteria include one or more of:
  power class;
  geographic location;
  traffic load; and
  user equipment measurement report.

27. The apparatus of claim 20, further including configuration of the at least one processor:
  to obtain, by the target transmitter, a second priority schedule for the transmission opportunity, wherein the second priority schedule identifies transmission priority for a plurality of network operators;
  to monitor, by the target transmitter, one or more clear channel assessment (CCA) slots prior to the transmission opportunity for one or more operator preambles; and
  to determine, by the target transmitter, a highest priority operator preamble detected during execution of the configuration of the at least one processor to monitor the one or more CCA slots, wherein the highest priority operator preamble is determined according to the second priority schedule, wherein at least the configuration of the at least one processor to monitor the medium sensing slots, to determine the highest priority medium reservation signal, and to transmit the data are performed in response to the highest priority operator preamble corresponding to a target network operator associated with the target transmitter.

28. The apparatus of claim 27, wherein the one or more operator preambles is a single operator preamble of a highest priority operator and the one or more CCA slots is a single CCA slot assigned to the highest priority operator.

29. The apparatus of claim 27, wherein each of the one or more CCA slots is assigned to a different network operator.

30. The apparatus of claim 29, wherein the configuration of the at least one processor to obtain the second priority schedule includes configuration to receive priority information from an operator reservation signal detected in each of the one or more CCA slots, wherein the operator reservation signal is sent in response to the one or more operator preambles.

* * * * *